Feb. 4, 1947.   S. C. HURLEY, JR   2,415,179
PHOTOELECTRIC INSPECTION DEVICE
Filed Sept. 23, 1944   4 Sheets-Sheet 3

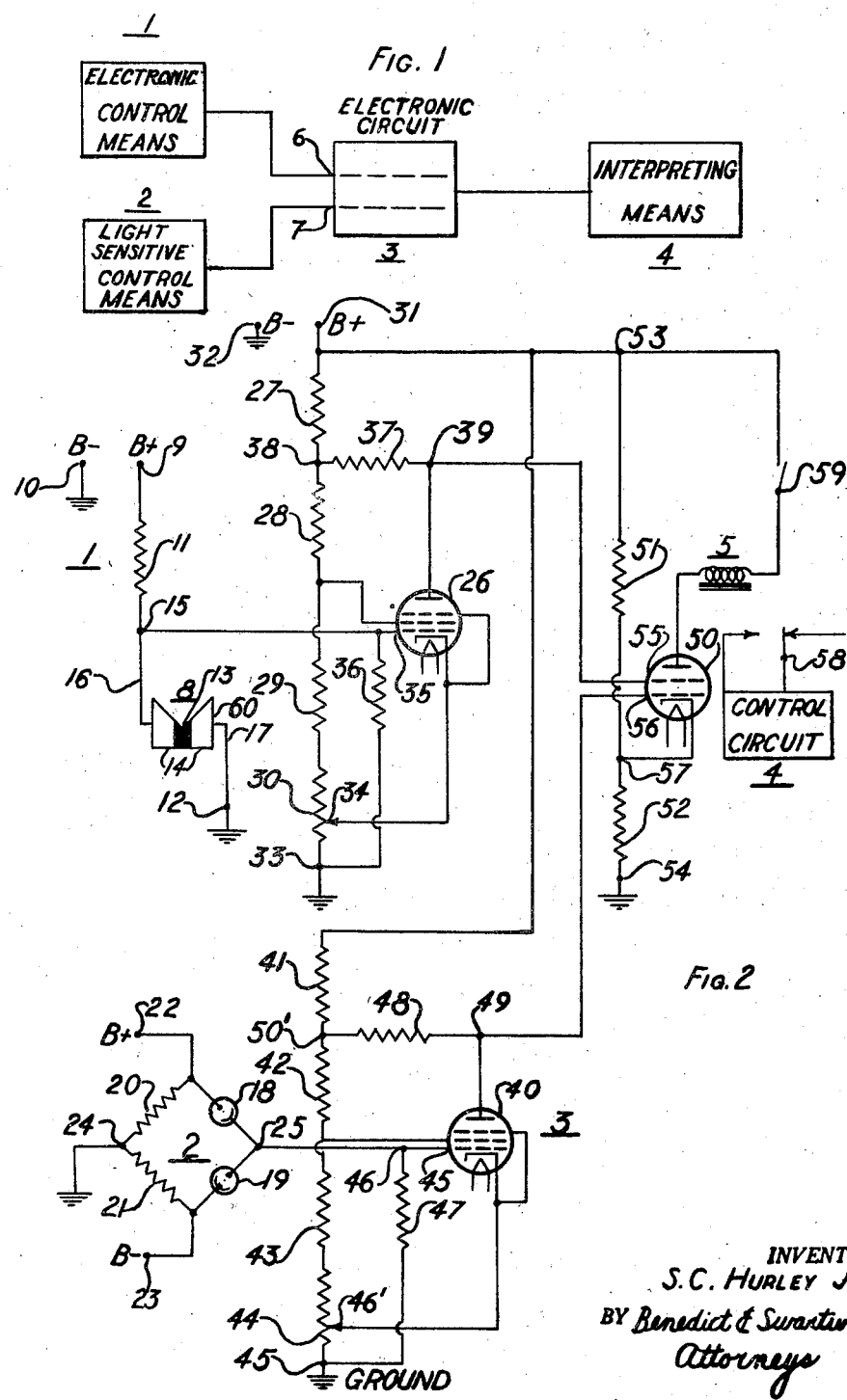

INVENTOR.
S.C. HURLEY JR.
BY Benedict & Swartwood
Attorneys

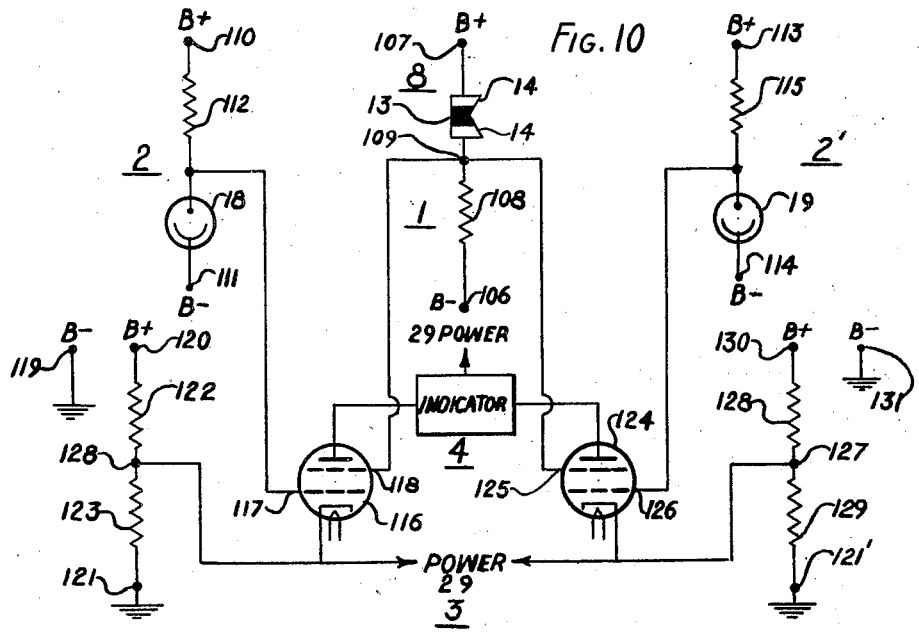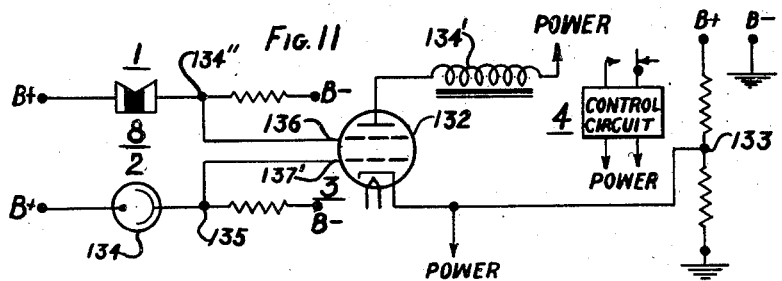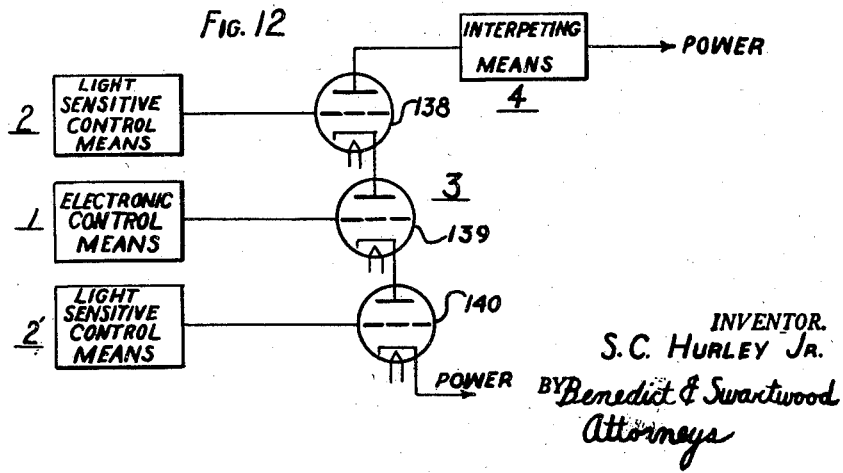

Patented Feb. 4, 1947

2,415,179

UNITED STATES PATENT OFFICE 2,415,179

PHOTOELECTRIC INSPECTION DEVICE

Samuel C. Hurley, Jr., Danville, Ill.

Application September 23, 1944, Serial No. 555,475

3 Claims. (Cl. 88—14)

This application is a continuation in part of my abandoned application, Serial Number 480,025, filed March 22, 1943, which in turn, is a continuation in part of my abandoned application Serial Number 473,187, filed January 22, 1943.

Broadly, my invention relates to an apparatus for the inspection of articles and objects by electronic gauging. It particularly relates to a novel electronic circuit for use in making precision dimensional measurements wherein at least two control grids in the electronic circuit are independently controlled with at least one of the control grids controlled by an electronic means which includes a means for the proper positioning of the article in the inspection zone.

An object of my invention is to provide an improved sizing device in which a specimen is tested for size by positioning the same in a beam of light.

My simple circuit provides many advantages over those previously used. In the first place, a single relay is all that is necessary to either cause acceptance of the article or cause rejection of the article. In high speed, accurate precision measurements of the kind I employ in my inspection operations, it is undesirable to use any more relay coils and switches than are absolutely necessary since each relay has a certain time lag which slows down the inspection and since such relays must be kept in perfect condition in order to insure accurate measurements, it is readily seen that the fewer relays used, the more accurate and precise measurements of this kind become.

Furthermore, my novel means for determining the proper positioning of the article in the inspection zone in order to establish a proper reference point has many advantages. Mechanical switches are undesirable for the same reason that relay switches are undesirable. They are not accurate and are expensive and the upkeep, not even counting the cost, is undesirable since in precision measurements it is of the utmost importance that the mechanism function properly in order to prevent a bad piece from being mixed with a good piece. Precision measurements of the kind which may be made by my invention are usualy only made on articles where it is necessary to make sure that all of the articles accepted are good, and it is not enough merely to sort the articles into good or bad and end up with only 95% of the accepted articles being good. The inspection device must function perfectly. This is readily seen since my device is useful in connection with testing machined parts and the like for use in automobiles, airplanes, machines of war, bullets, projectiles, etc., where any failure of the testing mechanism might cause a bad piece to be used in one of the above machines which could readily result in not only the loss of property, but in loss of life, particularly when those articles are used in the machines which are inherently dangerous such as an automobile or an airplane. Also, it is obvious that articles for use in war must be perfect and a testing machine for size must accept only good pieces.

I insure the proper reference point by preventing the actuation of the selecting or indicating means if the piece is not properly positioned in the inspection zone. I accomplish this by providing a means for orienting the piece in the inspection zone or, in other words fixing the reference point, by completing an electronic circuit when the piece is properly positioned, which controls a control grid in a power tube, said grid causing actuation of the indicating means only when the piece is in proper position. It is apparent that mechanical switches would not be suitable or desirable for this purpose.

While my invention has many uses, it is particularly advantageous for use in connection with making precision dimensional measurements, by which I mean, (1) measuring an article for given size, (2) determining the size of the article, (3) determining the shape of the article such as determining a bevel or an angle, (4) determining the position of various machined, tooled or cast parts of an article such as a slot, a notch, a groove, a ridge, etc.

My invention relates particularly to an electronic circuit comprising control grids, controlled either directly or indirectly by independent means, at least one of said means being an electronic means responsive to the proper positioning of the article in the testing zone and at least one of said means being a light sensitive means. The circuit conducts a current only when the control grids are simultaneously driven in a positive direction in respect to the potential of their respective cathodes and the current flowing through the electronic circuit is reduced or stopped by driving the potential of either of the control grids in a negative direction. In other words, the bias on the control electrodes must be positive or at least of a low negative value in respect to their cathodes at any given instant so as to cause current to flow through the electronic circuit but the bias of each tube may be independently and separately changed to stop the flow of current through the electronic circuit.

Throughout the specification, when I refer to positive bias or a positive potential on the control grid with respect to the cathode, I mean a bias at least of the proper potential to initiate conductance of a tube or render it conducting. Some tubes, depending upon their operating characteristics, will begin to conduct or will ionize when the potential of the control grid is slightly negative with respect to the cathode, usually within about five volts.

Other objects, advantages, uses and applications of my apparatus will become apparent by referring to the drawings in which Figure 1 shows diagrammatically the broad principle of my invention wherein the flow of current from the electronic circuit is controlled by both an electronic means and a light sensitive means.

Figure 2 shows a detailed wiring diagram suitable for use in my invention wherein the power tube is controlled by the flow of current through two amplifying tubes, one of said amplifying tubes controlled electronically and the other amplifying tube controlled photoelectrically.

Figure 10 shows an electronic circuit suitable for use in sorting or selecting articles according to size.

Figure 11 illustrates an electronic circuit wherein the control grid controlled by the electronic control means and the control grid controlled by the light sensitive control means are placed in the same power or amplifying tube.

Figure 12 illustrates diagrammatically the use of three power tubes, two of which are controlled by a light sensitive control means and one by an electronic control means.

Figure 3:
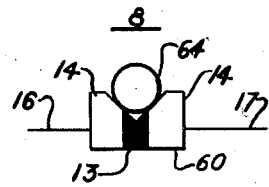
Figures 3, 4, 5, 6 and 7 show different means for positioning the article in the inspection zone and for controlling the electronic control means completing an electronic circuit.

Referring to Figure 1, the reference numeral 1 indicates the electronic control means; reference numeral 2 indicates the light sensitive control means; reference numeral 3 indicates the electronic circuit responsive to control means 1 and 2; and reference numeral 4 indicates the interpreting means responsive to electronic circuit 3. The control grid 6 in the electronic circuit 3 is controlled by the electronic control means as hereinafter described. The control grid 7 in the electronic circuit is controlled by the light sensitive control means 2. The interpreting means 4 is actuated when the control grids 6 and 7 are simultaneously driven in the same direction of potential so as to permit a flow of current in the electronic circuit or at least a flow of current through the power tube or tubes actuating an energy translation means. This circuit may operate in a number of ways within the scope of my invention. For example, the bias on the grids 6 and 7 may normally be maintained negative and the interpreting means not actuated unless both grids are simultaneously driven in a positive direction sufficiently to cause current to flow through the electronic circuit. Or the control grids 6 and 7 may normally be positive causing current to flow through a portion of the electronic circuit, but the power tube actuating the interpreting means not actuated until the bias on the control grids 6 and 7 is driven sufficiently negative to prevent a flow of current through a part of the electronic circuit. In another modification, either control grid 6 or 7 may normally be maintained positive and the other negative and the interpreting means not actuated until the latter grid is driven sufficiently in a positive direction. In this type of operation, the bias on the control grid which is normally positive is changed only through improper operation or the passing of a bad piece through the inspection zone. Other combinations are possible but I believe the above illustrations indicate the various means of independently controlling the control grids in an electronic circuit by an electronic means and by a light sensitive means. Throughout the description of the drawings, the same numbers are used for comparable parts.

Referring to Figure 2, the electronic means 1 comprises means 8 for properly positioning the article to be inspected in the inspection zone, A source of D. C. potential is provided having its positive terminal at 9 and its negative terminal at 10. Means 8 is connected to terminal 9 through a resistor 11 and is grounded at 12. An insulating material 13 is provided between electrical conductors 14 forming the V block 60 which is particularly useful for orienting round objects in the inspection zone. It should be noted that unless the object is properly placed in the V block 60, no current flows from the positive terminal 9 to the ground 12 and the potential at the point 15 is substantially that of the positive terminal 9 of the source of D. C. potential. When the object being measured, said object being a metallic object capable of conducting an electrical current, is properly positioned in the V block 60, it connects the two sides 14 of the V block causing current to flow to the ground 12. The apparatus illustrated in Figure 2 is described in connection with precision inspections for determining the size of an article. I therefore employ a pair of phototubes 18 and 19 in a bridge circuit 2 which corresponds to the light sensitive control means 2 of Figure 1. The bridge is connected in such a manner that when phototube 18 is in shadow and phototube 19 is in light, the article meets the requirement for size and the bridge is unbalanced in a direction of negative potential. Phototubes 18 and 19, together with resistors 20 and 21 form the four arms of an electrical bridge, connected to a source of D. C. potential with its positive terminal at 22 and its negative terminal at 23 and grounded at 24. The mid-point of the bridge is at 25 and it is apparent that when the bridge is balanced, no current is flowing across the bridge. When tube 18 is in shadow and tube 19 is in light, current flows across the bridge placing a negative potential at the point 25.

An amplifying tube 26, preferably, although not necessarily, of the pentode type, has its operating current and voltages provided by dividing resistors 27, 28, 29 and 30 connected across a source of D. C. potential having its positive terminal at 31, its negative terminal at 32 and grounded at 33. The bias on the tube is adjusted by connecting the cathode to the slidable contactor 34 on resistor 30. The control grid 35 of the tube 26 is connected to the ground 33 through the resistor 36 and to the electronic control means 1 at point 15 and the bias on the control grid 35 is such as to normally cause tube 26 to conduct. When the article to be inspected is properly positioned in the V block 60, the two sides 14 of the V block are connected causing a negative potential to be placed on the control grid 35 sufficient to stop or to greatly reduce the flow of current through the tube 26. A loading resistor 37 is connected between the point 38 and the anode of the tube 26 such that the more current flowing through the tube 26, the more negative is driven the potential at the point 39. It is apparent that when no current flows through the plate circuit of the tube 26, the potential at point 39 is substantially the same as at point 38.

In like manner, an amplifying tube 40 of the pentode type is connected to the source of direct current having its positive terminal at 31 and its operating current and voltages are provided by the dividing resistors 41, 42, 43 and 44 with a ground at 45. The bias on the tube 40 is adjustable by adjusting the slidable contactor 46' on the resistor 44. The control grid 45 is connected to the mid-point 25 of the bridge circuit 2, and a connection is made across the bridge by connecting the point 46 to the ground through the resistor 47. The bias on tube 40 is adjusted so that when the bridge is in balance or is unbalanced in a direction of positive potential, the tube 40 will conduct. Tube 40 is prevented from conducting only when the bridge is unbalanced in a direction of negative potential as caused by the state of illumination of the light sensitive devices when the article is of the predetermined size as will be hereinafter described. In the plate circuit of tube 40 is included a loading resistor 48 placed between points 49 and 50' such that when no current flows through tube 40, the potential of the point 49 is substantially that of point 50'; but when current flows through 48, the potential of point 49 is driven in a negative direction. A power tube 50, preferably, although not necessarily, of the gas-filled arc discharge type has its operating voltage provided by connecting dividing resistors 51 and 52 to the D. C. source of potential at 53 and to the ground at 54. Two control grids are provided in tube 50, one of said grids 55 connected to the point 39 and the other grid 56 connected to the point 49. The bias on the tube 50 is maintained sufficiently negative so as to prevent any current flowing in its plate circuit when current flows through either of the tubes 26 and 40. The cathode of the tube 50 is connected at point 57 between the dividing resistors 51 and 52. An energy translation means 5 shown as a relay coil is provided in the plate circuit of the tube 50. A control circuit 4, actuated by the energy translation means 5, has its circuit completed by the relay switch 58, shown in the open position but which is closed when the relay coil 5 is actuated. Control circuit 4 may be an indicating means or may be a circuit used for sorting or it may be a selection circuit used for accepting or rejecting the article according to whether or not the article meets a predetermined specification. When the tube 50 which is of the arc discharge gas-filled type is connected to a direct current source of power and is ionized, it continues to ionize and conduct no matter what is the potential on the control grid. Therefore it is necessary to provide some means of interrupting the ionization or conductance of the tube 50 between inspections. Although any suitable means may be used for this purpose, I have provided switch 59 in the anode circuit of tube 50 which may be opened prior to the next inspection in order to de-ionize tube 50 and place it in operative condition for indicating the next inspection. The switch 59 may be controlled by any suitable means and one way is to control it by a cam (not shown) which is correlated with the feeding mechanism used for introducing the specimens into the inspection zone.

It should be noted that the control circuit 4 is not actuated or is normally manintained open unless some positive action occurs. In inspecting a round for diameter, the round is placed in the V block 60. If it is properly positioned, it will connect the two sides 14 of the V block 60, placing a negative potential on the control grid 35 of the tube 26 which prevents that tube from conducting, which, in turn, places a positive potential on the control grid 55 of the tube 50, permitting that tube to conduct providing the proper potential is placed on the control grid 56. If the round is of the proper diameter or is within the predetermined tolerance range tube 18 will be darkened and tube 19 will remain in light which will cause the bridge 2 to place a negative potential on the control grid 45 of tube 40 which will decrease or stop the flow of current in the plate circuit of tube 40 which, in turn, causes a sufficient positive potential to be placed on grid 56 to cause tube 50 to conduct since, as heretofore described, a positive potential has been placed on the control grid 55 and therefore the control circuit will be actuated by the relay coil 5.

It is apparent that when the piece is improperly positioned in the inspection zone or if it is of an improper size, the control circuit 4 will not be actuated; thus, I accomplish the objects of my invention which are to determine the size photoelectrically and to insure the proper fixing of the reference point by electronically establishing it.

Figures 3 to 7 illustrate different ways electronic gauging may be accomplished and all may be used in connection with any of the wiring diagrams described herein.

Figure 3 shows the round properly positioned in the inspection zone which will cause current to flow through lines 16 and 17, which are the lines shown in Figure 2 connected to opposite sides of the V block 60.

Figure 4:
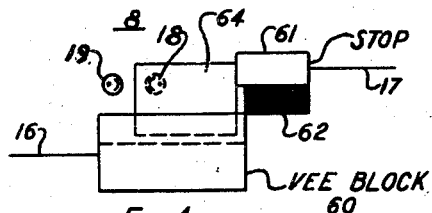

Figure 4 shows the positioning of a round in a V block 60 against a stop 61. The stop 61 is insulated from the V block 60 by means of insulator 62. Thus, current cannot flow through lines 16 and 17 unless the object contacts the stop 61 and the V block 60. This means is particularly useful for indicating length and for this purpose phototubes 18 and 19 are positioned so that when the piece has a length within the requisite tolerance, tube 18 is in shadow and tube 19 is in light.

Figure 5:
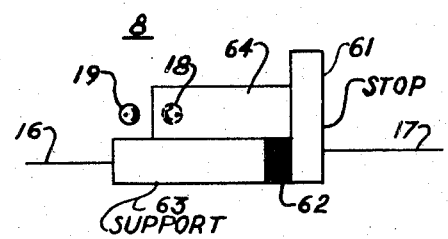

Figure 5 shows another method of fixing the reference point where the object may be flat and it is desired to measure the length. In this case, the support 63 is insulated from the block 61 by means of insulator 62 and when the object is properly positioned, current flows through lines 16 and 17.

Figure 6:
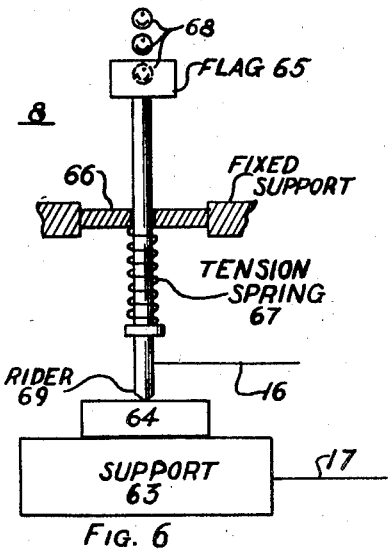

Figure 6 shows a means wherein a rider 69 rides on the object 64 to be inspected. The other end of the rider supports a flag 65, said flag being used to intercept the light beam passing through the inspection zone for making the photoelectric inspection. The rider is movably attached to support 66 and its up and down motion controlled by the tension spring 67. This device is particularly useful in sorting objects according to different sizes, and is particularly useful either as shown or by proper adaptation of ring gages for measuring threads for maximum diameter, pitch diameter, etc. The article 64 is placed under the rider 69 and the rider will be raised upward shadowing one or more of the phototubes 68. By properly connecting phototubes 68 in one of the light sensitive circuits described and illustrated herein they can be used to indicate the size of the article. The reference point is established when the object 64 connects the rider 69 to the support 63, thereby causing current to flow through the line 16 and 17, said current controlling one of the control grids in my electronic circuit.

Figure 7:
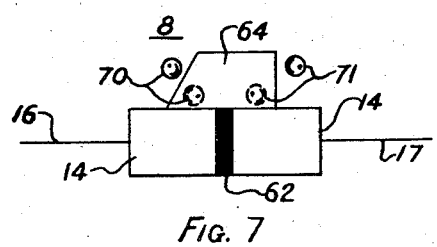

Figure 7 shows a means used for fixing a reference point for a flat object where it is desired to measure a bevel or an angle. The two sections 14 of the support are separated by the insulating material 62. When the piece is properly oriented, it will close the circuit and cause current to flow through lines 16 and 17. Phototubes 70 are used for checking the bevel and phototubes 71 are used for checking the right angle.

Figures 3 to 7 are illustrative of various means for establishing the reference point but other means within the scope of my invention may be used.

Figure 8:
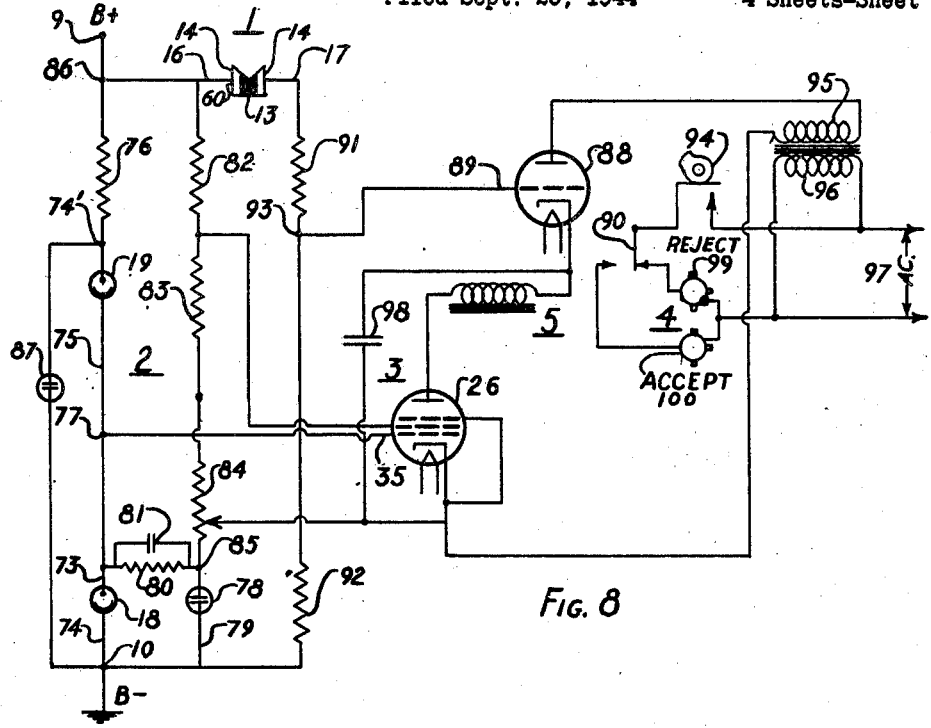
Figure 8 shows in detail another wiring diagram suitable for use in my device wherein the energy translation means is connected in series with two power tubes.

Referring to Figure 8, phototube 18 is connected between leads 73 and 74 and phototube 19 is connected between leads 74' and 75. The leads 73 and 74 connected with phototube 18 and the leads 74' and 75 connected with phototube 19 together with resistor 76 constitute two arms of a bridge, the point of junction being at 77. A third arm of the bridge comprises a voltage regulating tube 78 preferably of the glow-discharge type, connected in lead 79, which joins the arm of the bridge including phototube 18 at the point 10 at which point both arms are grounded. Resistor 80 shunted by condenser 81 bridges the arm including phototube 18 and the arm including regulating tube 78. The bridge controls the control grid 35 of the amplifying tube 26, preferably although not necessarily of the pentode type, having a relay coil 5 connected in its anode circuit said tube receiving operating voltages from voltage dividing resistors 82, 83, and 84, forming the fourth arm of the bridge. This arm joins the arm comprising the voltage controlling tube 78 at the point 85 and also joins the arm comprising the resistor 76 and the phototube 19 at 86. At the point 86, the positive terminal 9 of a source of direct current voltage is connected, the negative terminal of said source being connected to the ground at point 10. The voltage regulator tube 87, also preferably of the glow-discharge type, is connected across the phototubes 18 and 19. The voltage regulator tube 78 maintains the point 85 at a substantially constant positive potential above ground irrespective of fluctuations in the voltage supply and the voltage tube 87 maintains the voltage across the bridge circuit including phototubes 18 and 19 substantially constant irrespective of the fluctuations of the voltage supply, the characteristics of tube 87 being such that the voltage across it is twice that across the tube 78.

The resistor 80 of relatively high resistance, determines the potential at the point 77 between the phototubes 18 and 19 when substantially no current flows through the tubes 19 and 18 or the currents flowing through the tubes are substantially equal. The control grid 35 of the tube 26 is connected to point 77 so as to be maintained at the same potential as that of point 77.

The cathode of the tube 26 is connected to a movable contactor engaging the resistor 84. The current flowing through the lower portion of the resistor 84 maintains a negative bias upon the control grid of the tube 26 through the resistor 80 when the bridge is balanced or when the bridge is unbalanced due to phototube 19 being in shadow and phototube 18 being in light. This bias is adjusted to maintain tube 26 cut off or at least maintained sufficiently non-conducting to reduce the plate current through tube 26 to a value insufficient to energize the relay coil 5. The screen grid of tube 26 may be connected between the resistors 82 and 83 so as to have maintained thereon a positive potential less than that on the anode of the tube. In operation when a specimen 64 is properly positioned in the test zone and the specimen is perfect or falls within the tolerance range set by the spacing of the tubes 18 and 19 in the optical system, one of the said tubes will be in shadow and the other will be in light; that is the bridge comprising said tubes will be unbalanced in the proper direction of potential for actuating relay coil 5. If the specimen is within the tolerance range, the phototube 19 will become conducting and the tube 18 remains non-conducting. If the resistance of the resistor 80 is sufficiently high, this causes the potential of the control grid of the tube 26 to be carried in a positive direction in respect to the cathode thereof so that the anode current of the tube 26 becomes sufficiently great to energize the relay coil 5 and operate the switch 90 as hereinafter described to accept the specimen. If, however, the specimen is sufficiently oversized to cause both tubes 19 and 18 to be in shadow or sufficiently undersized to cause both tubes to be in light or if in the operation, tube 18 should be in light and tube 19 in shadow, the bridge is balanced or unbalanced such that the plate current through the tube 26 remains insufficient to energize the relay coil 5.

The control tube 88 containing control grid 89 is employed to disable the amplifying tube 26 except when the specimen is properly oriented or properly placed in the V block 60. That is, it is used to fix the reference point in the photoelectric inspection. The V block 60 is shown as being made up of oppositely disposed conducting members 14 spaced by an insulating member 13. The tube 88 has its cathode circuit in series with the anode circuit of tube 26 with the relay coil 5 connected in this series circuit. When the tube 88 is in non-conducting condition due to the improper positioning of the article in the inspection zone, which means that the reference point is improper, tube 26 cannot cause relay coil 5 to actuate the swtch 90. The tube 88 is normally rendered non-conducting or substantially non-conducting by maintaining the control grid 89 at a lower potential than the cathode. This is accomplished by the electronic control circuit I including the conducting members 14 of the test block 60 and resistors 91 and 92 connected in series across the source of direct current supply. The control grid 89 of the tube 88 is connected between the resistors 91 and 92 at the point 93, and when no conducting test specimen is positioned in the test block 60, the control grid 89 of the tube 88 is at ground potential. Since the cathode of the tube 88 is always at a substantially positive potential, the potential of the control grid is negative with respect thereto. When a conducting test specimen is positioned in the test block 60, the circuit is established through the resistors 91 and 92 and the control grid 89 of tube 88 assumes a positive potential above ground equal to the voltage drop through the resistor 92. By properly balancing the resistances of the resistors 91 and 92, closing of the circuit between conducting members 14 can be made to carry the potential of the control grid of the tube 88 in a positive direction with respect to the cathode of the tube 88. The tube 88 then becomes conducting and upon the next closing of the alternating current circuit by means of the cam 94, as will be hereinafter described, tube 26 will function to accept the article positioned in the test block 60 if the specimen is within the tolerance range as hereinbefore described.

The anode voltage of the tube 88, as well as the anode voltage for the tube 26 is supplied from an alternating current line since the tubes are in a series circuit with the secondary 95 of a transformer having its primary 96 connected across the alternating current line 97. The relay coil 5 also in this series circuit may be employed as a filter inductance being by-passed by filter condenser 98 having one terminal connected to the cathode of the tube 88 and the other terminal connected to the cathode of the tube 26. By the connection shown, alternating current voltages can be isolated from the bridge circuit and the relay coil 5 is supplied with at least partly filtered direct current and the control tube 88 also functions as a power supply for the other control tube 26. One of the advantages of this circuit is that the power tube places substantially no load upon the current or power supply of the direct current source of potential used for controlling the grid voltages. Another advantage of the circuit shown in Figure 8 is that by using an alternating current in connection with gas-filled tubes of the type shown at 88, circuit breaking switches or other devices as shown at 59 in Figure 2 need not be used since the control grids 89 and 35 will control the current flowing through the gas-filled tube after it once starts to ionize. When the alternating current becomes negative on the anode side at the same instant the control grid 89 becomes negative the control grid will take over and thereafter will control the ionization of the tube.

Figure 9:
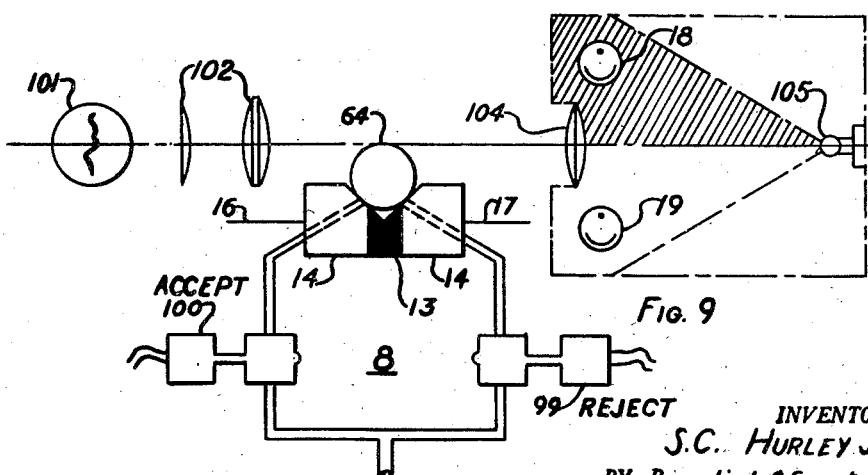
Figure 9 shows an optical system used in connection with my invention and physical means for accepting and rejecting articles according to the inspection desired.

The physical means used for selecting an article according to a predetermined size is shown in Figures 8 and 9. Solenoid controlled air valves 99 and 100 connected to a suitable source of power such as the alternating current source 97 may be used. In Figure 8, it should be noted that the relay switch 90 completes the circuit for actuating reject valve 99 when relay coil 5 is not energized and valve 100 is not actuated until some positive action is caused by the electronic circuit for pulling relay switch 90 over to a position where the accept circuit is closed. It is preferable to use air under relatively high pressure as a means for accepting and rejecting the article and this is shown in Figure 9. Referring to Figure 8, the purpose of the cam 94 which is synchronized with the feeding mechanism is to close the reject circuit just prior to the inspection in order that the blast of air will not be going through the valve 99 at all times.

Referring to Figure 9, 101 indicates a source of light which may be an incandescent electric light bulb providing a concentrated source of light although any other suitable source of concentrated light may be used. Condensing lenses 102 are positioned adjacent bulb 101 to direct a concentrated light beam upon the specimen 64 to be tested, said bulb preferably, but not necessarily, being located on the optical axis of the lenses 102. A projecting lens 104 is preferably positioned to have its optical axis in alignment with the optical axis of the condensing lenses 102 and is positioned upon the opposite side of the specimen 64 from the condensing lenses to receive light passing specimen 64.

My invention is particularly adapted to be employed in selecting or rejecting articles of manufacture on the basis of size or dimension and in order to accomplish this, the articles of manufacture or specimens are positioned in the light beam between the condensing lenses 102 and the projecting lens 104 so as to intercept a portion of the light of said light beam. A V block or support is employed to support the specimen 64. For convenience, the specimen is illustrated as being a cylindrical element, the diameter of which is a critical dimension and forms the basis of the selection or rejection.

The V-block or support is preferably, but not necessarily, positioned with respect to the optical axis of the complete lens system so that a perfect edge has its upper range slightly above said optical axis. It can readily be seen that a specimen larger or smaller in diameter than a perfect specimen intercepts a greater or lesser amount of light passing through the condensing lenses 102.

Spaced from the projection lens 104 and disposed with its optical axis substantially coincident with the optical axis of the lenses, as heretofore described, is a convex mirror 105 shown as being cylindrical. Other types of magnifying mirrors such as spheres, spherical segments, cylindrical segments, and the like, may be employed as the magnifying mirror. The light sensitive devices used in making the photoelectric inspection, comprise a pair of phototubes 18 and 19 which are positioned adjacent the projection lens 104, one on each side of the optical axis of the lens system.

The preferred arrangement is such that the specimen 64 to be tested, and the mirror 105, are positioned at the conjugate foci of the projecting lens so that a sharp shadow of the upper edge of the specimen 64 is projected upon the surface of the mirror 105. Depending upon the interception of light by different specimens, the tubes 18 and 19 may both be in shadow, both may be in light, or one may be in shadow and the other in light so that a very small displacement of the shadow on the mirror can cause a change from one of these conditions to the other. It can readily be seen that the spacing of the tubes 18 and 19 from the optical axis of the lens system determines the extreme ranges of the diameter of the specimen, that is, these distances are employed to limit the tolerance of a substantially perfect specimen with reference to a perfect specimen. It can also be seen that as the diameter of the specimen exceeds the upper limit of tolerance, both tubes 18 and 19 will be in shadow. Likewise, if the diameter of the specimen is below the lower limit of tolerance, both tubes will be in light. However, when one tube is in shadow and the other tube is in light when properly employing my bridge circuit, an acceptable specimen in indicated.

It is clear that substantially any degree of magnification may be obtained merely by moving mirror 105 toward or away from the tubes 18 and 19 while at the same time adjusting the position of the projecting lens 104 to maintain the system in focus. Alternatively, the tubes 18 and 19 may be moved toward or away from the mirror 105. Likewise, substantially any tolerance may be established by the proper spacing of the tubes 18 and 19 from each other or from the optical axis of the lens system and a sharp cutoff may be obtained at the extremities of the range. It will be apparent that the over and under tolerances may be independently adjusted by independently moving the tubes with respect to the optical axis of the lens system.

Figure 10 illustrates the use of my device for indicating size or selecting or sorting articles of manufacture for size. For example, it may be used in sorting bearings for different sizes. While I have illustrated in Figure 10 means for sorting two different sizes, any number of sizes may be sorted by using additional units of light sensitive devices and amplifying tubes. If a large number of sizes are desired to be sorted, the optical system shown in Figure 9 may be modified, for example, the same tube or any number of phototubes may be masked so that only a predetermined portion of an image of the object strikes a particular section of the phototube or a particular phototube.

Further referring to Figure 10, the fixing of the reference point is effected in a manner heretofore described, and the means therefor is shown in Figure 10 as a circuit including the V block 8 which has elements 14 insulated by material 13 and the entire V block connected to a direct current source of potential having its negative terminal at 106 and its positive terminal at 107. A resistor 108 is provided adjacent the negative terminal 106 to provide a positive potential at the point 109 when the specimen, properly positioned in the V block, completes the circuit from 107 to 106. A light sensitive control means 2 for controlling the control grid as previously described, is shown as including phototube 18 connected in a circuit comprising positive terminal 110, negative terminal 111 and resistor 112. A similar circuit 2' is provided with phototube 19, connected to the negative terminal 114, with resistor 115 adjacent to the positive terminal 113.

An amplifying tube 116 comprises two control grids, 118 and 117. Control grid 117 is controlled by the photoelectric circuit 2, and control grid 118 is controlled by electronic circuit 1. The operating voltage for tube 116 is obtained from a source of D. C. potential having its negative terminal at 119, its positive terminal at 120 and grounded at 121 through dividing resistors 122 and 123. Similarly, tube 124 contains control grid 125 controlled by circuit 1 and control grid 126 controlled by circuit 2'. The bias on tube 126 is maintained normally negative so as to prevent conduction by the tube by connecting the cathode at point 127, between resistors 128 and 129, connected to a source of D. C. potential having its positive terminal at 130 and its negative terminal at 131. A separate power source 29 may be used for the amplifying tubes 116 and 124 after conductance is initiated.

In operation of an apparatus in accordance with Figure 10 when no light is on the phototubes 18 and 19, sufficient positive bias is placed on tubes 116 and 126 as to cause them to conduct a current, providing the electronic circuit 1 has placed a positive potential on the control grids. However, when light strikes, e. g., phototube 18, a negative bias is placed on the control grid 117 which prevents tube 116 from conducting. In a similar manner, the conductance of tube 124 is controlled. Let us assume that tube 18 is used for indicating the minimum size article desired to be tested and tube 19 the next size article. When the article of the minimum size is properly placed in the inspection zone, it will cause current to flow through the V block which will place a positive potential on control grid 118 and at the same time, since it is of the minimum size to be tested, a positive potential will be placed on control grid 117, which will cause tube 116 to conduct and the indicator will be actuated. Likewise, if the next specimen corresponds to the next size, it will darken phototube 19 and the indicator 4 will indicate that the next sized article is in the testing zone. Thus, I have described a method using my principle of fixing the reference point for sorting articles according to size. The indicator 4 may be a common indicator for all sizes or separate indicators may be employed or physical means for sorting such as solenoid controlled gas valves, may be employed.

Referring to Figure 11, a method of controlling the flow of current through an electronic circuit, embodying the principle of fixing the reference point, is illustrated wherein the control grid controlled by the electronic control means and the control grid controlled by the light sensitive control means are placed in the same power or amplifying tube. But in general, the principle of operation is similar to that heretofore described. In this case let us assume that the phototube illustrated should be in light when a good piece is to be indicated. The bias on the amplifying tube 132 is normally maintained negative since its cathode is connected to point 133 which is more positive than the points 134" and 135. When the piece is properly positioned in the V block 8 and the phototube 134 is in light, a positive bias will be placed simultaneously on the two control grids 136 and 137 which will cause current to flow through the amplifying tube 132, actuating the relay coil 134' which is used to control the control circuit 4. It should be noted that in my means of fixing a reference point the control grid controlled by the electronic control means, as well as other control grids, at least one of which is controlled by a light sensitive control means, may be placed in the same amplifying or power tube or the control grids may be placed in separate power or amplifying tubes in the same electronic circuit; but in all cases, the control circuit, the energy translation means, the selecting means, or the sorting means is only actuated by the positive action of simultaneously driving the control grids in the electronic circuit in the same direction of potential, and the energy translation means, the control means, etc., can be prevented from being actuated by independently changing the potential of either one of the control grids in the opposite direction. That is to say, it takes simultaneous action by the electronic control means and the photoelectric control means to obtain the positive action, but either control means may independently prevent the positive action from occurring.

Referring to Figure 12, another method similar to that illustrated in Figure 1 is illustrated diagrammatically, wherein three power tubes, 138, 139, and 140 are connected in series and the control grid for 138 controlled by a light sensitive control means 2 and the control grid of the tube 139 controlled by electronic means 1 and the control grid of tube 140 controlled by the light sensitive control means 2'. The potentials on the control grids must all be carried in the same direction in order to actuate the interpreting means.

The above description of the various modifications within the broad principles of my invention is given for illustrative purposes only and they are not to be considered necessarily equivalent, nor are they to be considered as limiting my invention since my invention is only limited by the following claims:

I claim as my invention:

1. An apparatus for dimensional inspection of electrically conducting articles comprising a circuit including electronic amplifying means having two independently controlled grids cooperatively arranged so as to jointly control the flow of current in said circuit, an indicating means, means in said circuit responsive to change in flow of current in said circuit for controlling said indicating means, a photoelectric device electrically connected to one of said grids for controlling the bias thereon in accordance with the condition of illumination of said device, means for supporting an article to be inspected in an inspection zone, means for projecting a beam of light through said zone, said photoelectric device being positioned relative to said supporting means so that standard articles and non-standard articles produce different conditions of illumination of said device when the articles are correctly positioned on said supporting means with reference to the dimension to be inspected, means for controlling the other of said grids comprising a normally open circuit including a source of potential and said other grid, and means for completing said circuit comprising spaced contacts connected to the ends of said circuit and positioned so as to be engaged by spaced portions of an electrically conducting article when the article is correctly positioned on said supporting means with reference to the dimension to be inspected.

2. The apparatus of claim 1 wherein the said electronic amplifying means comprises a single electronic tube containing said two grids.

3. An apparatus for dimensional inspection of electrically conducting articles comprising a circuit including electronic amplifying means having two independently controlled grids cooperatively arranged so as to jointly control the flow of current in said circuit, an indicating means, means in said circuit responsive to change in flow of current in said circuit for controlling said indicating means, a photoelectric device electrically connected to one of said grids for controlling the bias thereon in accordance with the condition of illumination of said device, means for supporting an article to be inspected, means for producing different predetermined conditions of illumination of said photoelectric device in response to the placing of standard articles and non-standard articles respectively on said support, said photoelectric device being positioned relative to said supporting means so that standard articles and non-standard articles produce different conditions of illumination of said device when the articles are correctly positioned on said supporting means with reference to the dimension to be inspected, means for controlling the other of said grids comprising a normally open circuit including a source of potential and said other grid, and means for completing said circuit comprising spaced contacts connected to the ends of said circuit and positioned so as to be engaged by spaced portions of an electrically conducting article when the article is correctly positioned on said supporting means with reference to the dimension to be inspected.

SAMUEL C. HURLEY, Jr.

REFERENCES CITED

The following references are of record in the file of this patent:

UNITED STATES PATENTS

| Number | Name | Date |
| --- | --- | --- |
| 2,085,671 | Powers | June 29, 1937 |
| 2,070,339 | Moors | Feb. 9, 1937 |
| 2,188,159 | Rockwood | Jan. 23, 1940 |
| 2,033,645 | Parkhill | Mar. 10, 1936 |
| 2,114,867 | Wilson | Apr. 19, 1938 |
| 2,171,362 | Gulliksen | Aug. 22, 1939 |
| 2,070,339 | Moore | Feb. 9, 1937 |
| 2,280,948 | Gulliksen | Apr. 28, 1942 |
| 2,138,645 | Rey | Nov. 29, 1938 |
| 2,014,174 | Francis | Sept. 10, 1935 |

FOREIGN PATENTS

| Number | Country | Date |
| --- | --- | --- |
| 470,638 | British | Aug. 17, 1937 |